United States Patent
Dresang et al.

(10) Patent No.: US 7,921,560 B1
(45) Date of Patent: *Apr. 12, 2011

(54) METHOD OF FORMING A LARGE DIAMETER EXTRUDED PIPE

(75) Inventors: Richard D. Dresang, Menomonee Falls, WI (US); Peter W. Utecht, Menomonee Falls, WI (US)

(73) Assignee: RASP, Inc., Menomonee Falls, WI (US)

( * ) Notice: Subject to any disclaimer, the term of this patent is extended or adjusted under 35 U.S.C. 154(b) by 1206 days.

This patent is subject to a terminal disclaimer.

(21) Appl. No.: 11/432,172

(22) Filed: May 11, 2006

Related U.S. Application Data

(63) Continuation-in-part of application No. 10/388,285, filed on Mar. 13, 2003, now Pat. No. 6,895,670.

(51) Int. Cl.
*B21D 51/16* (2006.01)
*F16L 9/00* (2006.01)
*F16L 23/00* (2006.01)

(52) U.S. Cl. ................ 29/890.14; 138/109; 285/416

(58) Field of Classification Search .............. 29/890.14, 29/460, 458, 890.09; 72/253.1, 368; 138/109; 285/405, 414, 415, 416
See application file for complete search history.

(56) References Cited

U.S. PATENT DOCUMENTS

| | | | | |
|---|---|---|---|---|
| 1,554,881 | A * | 9/1925 | Reimann | 285/382.4 |
| 2,208,821 | A | 7/1940 | Taylor | 285/111 |
| 3,369,555 | A * | 2/1968 | Heflin, Jr. | 134/123 |
| 4,659,396 | A * | 4/1987 | Lifka et al. | 148/690 |
| 4,832,383 | A | 5/1989 | Roussel | 285/416 |
| 5,447,583 | A * | 9/1995 | Arthur et al. | 148/689 |
| 6,568,711 | B2 * | 5/2003 | McKay | 285/22 |
| 2004/0250925 | A1 * | 12/2004 | Van Der Winden | 148/437 |

* cited by examiner

*Primary Examiner* — David P Bryant
*Assistant Examiner* — Alexander P Taousakis
(74) *Attorney, Agent, or Firm* — Donald J. Ersler

(57) ABSTRACT

A self-aligning flange includes a flange member, a collar member and a stop member. An inner perimeter of the collar member is sized to receive an outer perimeter of a pipe. The flange member extends outward from an outer perimeter of the collar member. The stop member extends inward from the inner perimeter of the collar member. A large diameter extruded pipe includes a continuous cross section of at least six inches in diameter. It is preferable to weld a flange to one end of the large diameter extruded pipe. Immediately after the large diameter extruded pipe has been formed in an extrusion press, it is sprayed with a coolant to increase the surface hardness thereof.

18 Claims, 2 Drawing Sheets

METHOD OF FORMING A LARGE DIAMETER EXTRUDED PIPE

CROSS-REFERENCES TO RELATED APPLICATIONS

This is a continuation-in-part application taking priority from Ser. No. 10/388,285 filed on Mar. 13, 2003, now U.S. Pat. No. 6,895,670.

BACKGROUND OF THE INVENTION

1. Field of the Invention

The present invention relates generally to flanges for pipes and more specifically to a self-aligning flange for pipes and a large diameter extruded pipe.

2. Discussion of the Prior Art

Typically, attaching a flange to end of a pipe requires that the end of the pipe be substantially square to the length of the pipe. If the end pipe is not substantially square, the flange must be first tack welded to ensure squareness, before assembly welding. The "tacked-on" flange must be measured to ensure squareness and then the flange is fully welded to the pipe. The above process is time consuming and expensive.

Vacuum pipes for the sewer cleaning industry having a diameter of at least six inches in diameter and have always been rolled and seam welded. Seam welded pipes must be fabricated from an aluminum sheet material that is relatively soft to allow the aluminum sheet material to be bent into a round cross-section. A 3004 H26 aluminum is typically used for seam welded pipe having at least an six inch diameter. The resulting surface hardness is 10-12 on a Rockwell "C" hardness scale. Further, the wall thickness of the six inch diameter seam welded pipe can only be 0.090 inches thick. Vacuum pipes are constantly exposed to banging and abuse and consequently do not last very long.

Accordingly, there is a clearly felt need in the art for a self-aligning flange, which does not require an end of a pipe to be perfectly square to its length, nor does it require tack welding. There is also a clearly felt need in the art for a large diameter extruded pipe, which has a thicker wall and a harder exterior surface than that of the prior art.

SUMMARY OF THE INVENTION

The present invention provides a self-aligning flange for pipes and a large diameter extruded pipe. The self-aligning flange includes a flange member, a collar member and a stop member. An inner perimeter of the collar member is sized to receive an outer perimeter of a pipe end. The inner perimeter of the collar member is preferably round, but other shapes may also be used, such as oval or square. The flange member extends outward from an outer perimeter of the collar member. The stop member extends inward from the inner perimeter of the collar member. The length of the collar member that contacts the pipe end is at least 6% of the pipe diameter or at least one and one half times the pipe wall thickness. The collar member is attached to an end of the pipe with welding, bonding epoxy or any other suitable attachment process.

A large diameter extruded pipe includes a continuous cross section (no seam) having an outer diameter of at least six inches. It is preferable to weld a flange to one end of the large diameter extruded pipe. It is also preferable to fabricate the large diameter extruded pipe from a 6005, 6060 or 6061 T-6 aluminum material, but other aluminum materials having a similar hardness may also be used. Immediately after the large diameter extruded pipe has been formed in an extrusion press, it is sprayed with a coolant to increase the surface hardness thereof.

Accordingly, it is an object of the present invention to provide a self-aligning flange, which aligns with a length of the pipe, such that the self-aligning flange may be attached square to the length of the pipe with a nonsquare pipe end.

It is a further object of the present invention to provide a self-aligning flange, which does not require tack welding, before a final welding operation.

Finally, it is another object of the present invention to provide a large diameter extruded pipe, which has a thicker wall and a harder exterior surface than a seam welded pipe.

These and additional objects, advantages, features and benefits of the present invention will become apparent from the following specification.

DETAILED DESCRIPTION OF THE PREFERRED EMBODIMENTS

Figure 1:
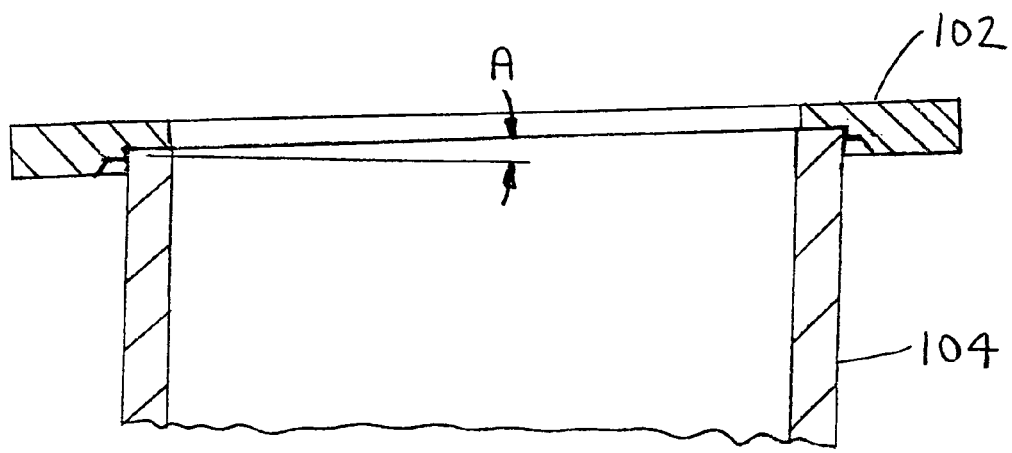
FIG. 1 is a cross sectional view of a prior art weld-on flange placed on a pipe end that is not square to a length of the pipe.
Figure 2:
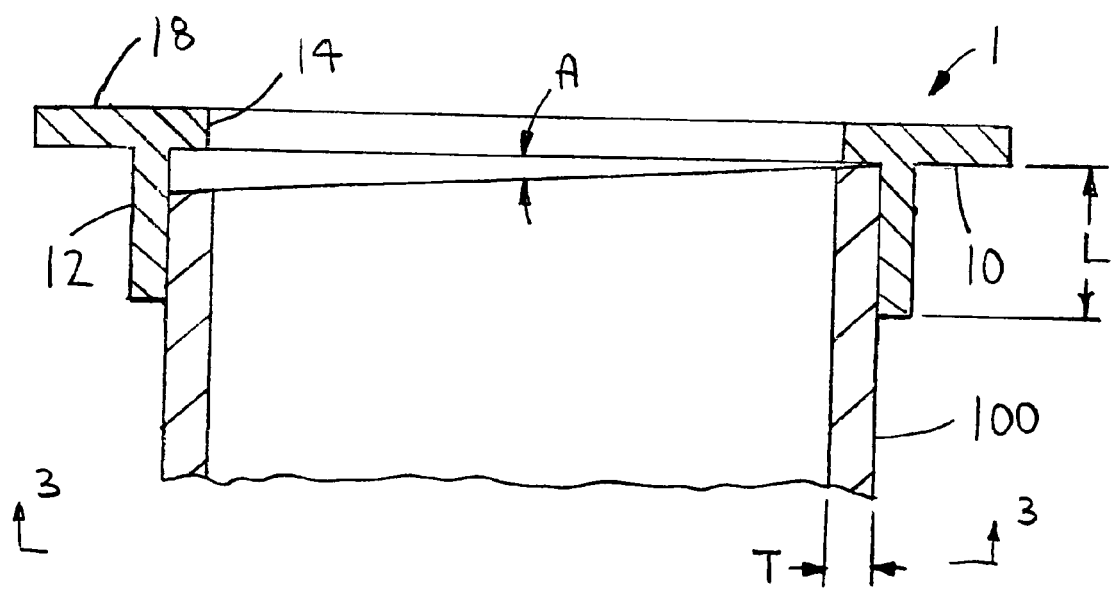
FIG. 2 is a cross sectional view of a self-aligning flange placed on a pipe end that is not square to a length of the pipe in accordance with the present invention.

With reference now to the drawings, and particularly to FIG. 2, there is shown a cross sectional view of a self-aligning flange 1 placed on a pipe 100. A pipe end of the pipe 100 is out-of-square with a length of the pipe 100 by an angle A. With reference to FIG. 1, a prior art weld-on flange 102 is placed on a pipe 104. A pipe end of the pipe 104 is out-of-square with a length of the pipe 104 by an angle A. The weld-on flange 102 must first be tack welded on to the pipe 104 to ensure thereof is square to a length of the pipe 104 or the pipe end of the pipe 104 must be cut square to a length of the pipe 104 to avoid tack welding. If the weld-on flange 102 is first tack welded; the weld-on flange 102 is then permanently welded to the pipe 104. Further, if an end of the pipe 104 is cut too out-of-square, the weld-on flange 102 cannot be welded on to the pipe 104.

Figure 3:
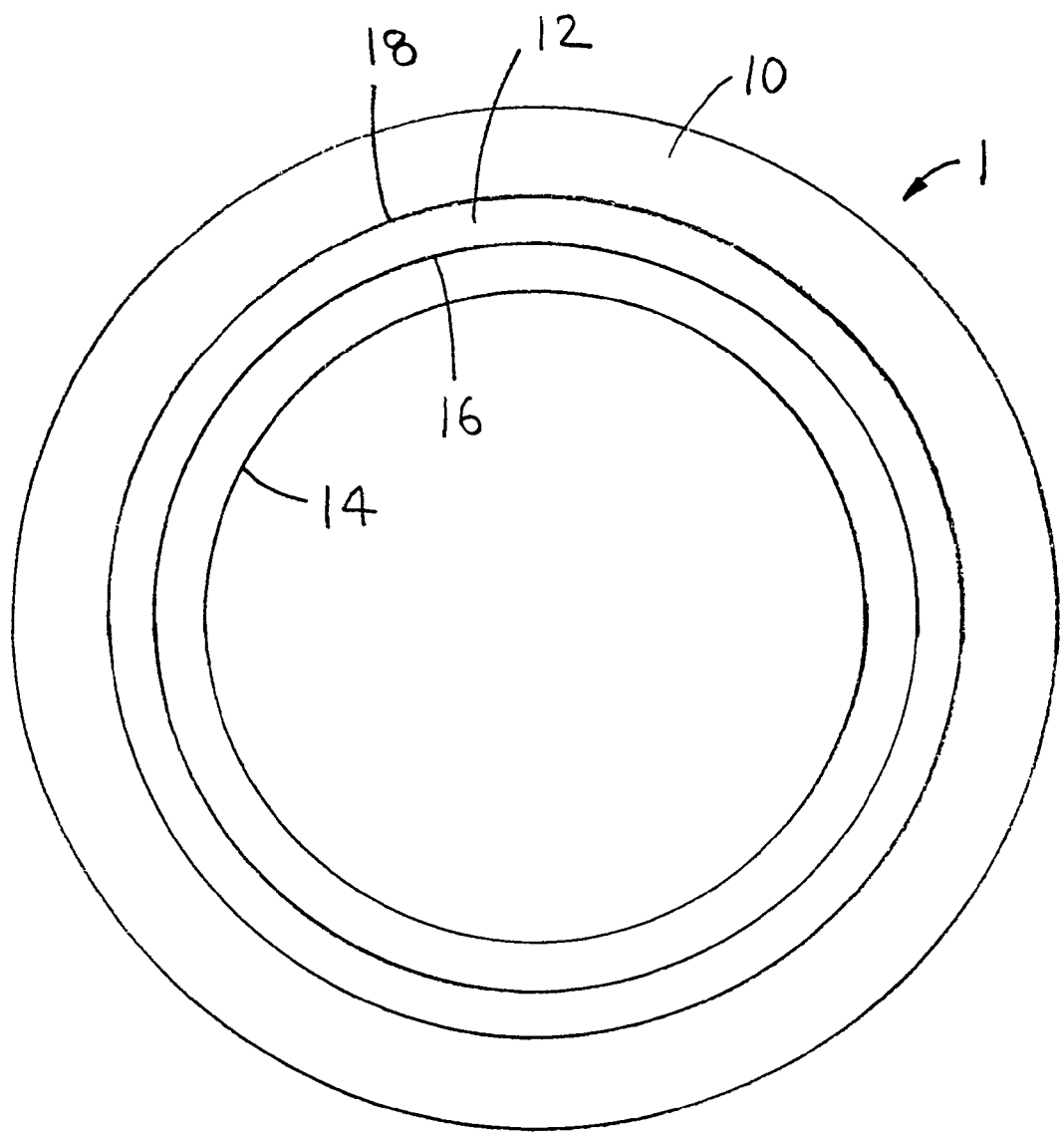
FIG. 3 is a rear end view of a self-aligning flange having a round shape in accordance with the present invention.

A self-aligning flange 1 includes a flange member 10, a collar member 12 and a stop member 14. With reference to FIG. 3, an inner perimeter 16 of the collar member 12 is sized to receive an outer perimeter of a pipe. The inner perimeter 16 of the collar member 12 is preferably round, but other shapes may also be used, such as oval or square. The flange member 10 extends outward from an outer perimeter of the collar member 12 and a face 18 of the flange member 10 is substantially perpendicular to the inner perimeter 16. The stop member 14 extends inward from the inner perimeter 16 of the collar member 12. A length "L" of the inner perimeter 16 is sufficient to cause the flange member 10 to be substantially perpendicular to a length of the pipe 100. The length "L" of the inner perimeter 16 is at least 6% of the pipe outer diameter or at least one and one half times a pipe wall thickness "T" of the pipe 100. The self-aligning flange 1 may be attached to an end of the pipe 100 by a welding operation, bonding epoxy or any other suitable attachment process.

A large diameter extruded pipe includes a continuous cross section having an outer diameter of at least six inches. It is preferable to weld a flange (such as the self-aligning flange 1) to one end of the large diameter extruded pipe. It is preferable to fabricate the large diameter extruded pipe from a 6005, 6060 or 6063 T-6 aluminum material, but other aluminum materials having a similar hardness may also be used. Immediately after the large diameter extruded pipe has been formed in an extrusion press, it is preferably sprayed with water to increase the surface hardness thereof. However, other coolants besides water may also be used. The best hardness obtainable for a seam welded aluminum pipe is a Rockwell "C" hardness of 10-12. Using the 6005, 6060 or 6061 T-6 aluminum material for the large diameter extruded pipe and spraying thereof with water, immediately after extruding, produces a Rockwell "C" hardness of 15-16. The greater the Rockwell "C" hardness number, the harder the material. The increased hardness of the large diameter pipe increases its durability and ability to resist denting. The thicker wall of the large diameter extruded pipe also resists denting better than the seam welded pipe. The wall thickness of the large diameter extruded pipe has a preferred thickness of between 0.070-0.13 inches. However, other thicknesses may also be used. Durability and ability to resist denting is advantageous for sewer cleaning pipes. The large diameter extruded pipe should not be limited to sewer cleaning applications, but should include any appropriate use.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A method of forming a large diameter vacuum pipe, comprising the steps of:
   providing one of 6005 T-6 aluminum material, 6060 T-6 aluminum material and 6061 T-6 aluminum material;
   extruding a pipe from said aluminum material to provide a seamless tubular cross section, said pipe having an outer diameter of at least six inches; and
   providing said pipe with a wall thickness of less than 2.2% of an outer diameter thereof; and
   spraying said pipe with a coolant immediately after said extruded pipe is formed to provide a Rockwell "C" surface hardness of at least fourteen to resist at least one of denting and bending, said pipe being used for vacuuming in sewer cleaning applications.

2. The method of forming a large diameter vacuum pipe of claim 1, further comprising the step of:
   attaching a flange on to one end of said pipe with one of welding and bonding epoxy.

3. The method of forming a large diameter vacuum pipe of claim 2, further comprising the step of:
   providing said flange as a self-aligning flange.

4. The method of forming a large diameter vacuum pipe of claim 2, further comprising the step of:
   providing said flange with a collar member, said collar member having an inner perimeter that is sized to receive an outer perimeter of said pipe.

5. The method of forming a large diameter vacuum pipe of claim 4, further comprising the step of:
   extending a flange member from an outside perimeter of said collar member, a length of said inner perimeter of said collar member causing a face of said flange to be substantially perpendicular to a length of said pipe.

6. The method of forming a large diameter vacuum pipe of claim 5, further comprising the step of:
   providing said inner perimeter with a length that is one of at least 6% of an outer diameter of said pipe and at least one and one half times a pipe wall thickness of said pipe.

7. The method of forming a large diameter vacuum pipe of claim 6, further comprising the step of:
   extending a stop member from an inside perimeter of said collar member.

8. The method of forming a large diameter vacuum pipe of claim 7, further comprising the step of:
   attaching said self-aligning flange to said pipe with one operation.

9. The method of forming a large diameter vacuum pipe of claim 2, further comprising the step of:
   attaching said self-aligning flange to said pipe without first tack welding.

10. A method of forming a large diameter vacuum pipe, comprising the steps of:
    providing one of 6005 T-6 aluminum material, 6060 T-6 aluminum material and 6061 T-6 aluminum material;
    extruding a pipe from said aluminum material to provide a seamless tubular cross section, said pipe having an outer diameter of at least six inches; and
    providing said pipe with a wall thickness between 0.070-0.13 inches; and
    spraying said pipe with a coolant immediately after said extruded pipe is formed to provide a Rockwell "C" surface hardness of at least fourteen to resist at least one of denting and bending, said pipe being used for vacuuming in sewer cleaning applications.

11. The method of forming a large diameter vacuum pipe of claim 10, further comprising the step of:
    attaching a flange on to one end of said pipe with one of welding and bonding epoxy.

12. The method of forming a large diameter vacuum pipe of claim 11, further comprising the step of:
    providing said flange as a self-aligning flange.

13. The method of forming a large diameter vacuum pipe of claim 11, further comprising the step of:
    providing said flange with a collar member, said collar member having an inner perimeter that is sized to receive an outer perimeter of said pipe.

14. The method of forming a large diameter vacuum pipe of claim 13, further comprising the step of:
    extending a flange member from an outside perimeter of said collar member, a length of said inner perimeter of said collar member causing a face of said flange to be substantially perpendicular to a length of said pipe.

15. The method of forming a large diameter vacuum pipe of claim 14, further comprising the step of:
    providing said inner perimeter with a length that is one of at least 6% of an outer diameter of said pipe and at least one and one half times a pipe wall thickness of said pipe.

16. The method of forming a large diameter vacuum pipe of claim 15, further comprising the step of:
    extending a stop member from an inside perimeter of said collar member.

17. The method of forming a large diameter vacuum pipe of claim 16, further comprising the step of:
    attaching said self-aligning flange to said pipe with one operation.

18. The method of forming a large diameter vacuum pipe of claim 11, further comprising the step of:
    attaching said self-aligning flange to said pipe without first tack welding.

\* \* \* \* \*